United States Patent [19]
Steckler

[11] 3,863,080
[45] Jan. 28, 1975

[54] CURRENT OUTPUT FREQUENCY AND PHASE COMPARATOR

[75] Inventor: Steven Alan Steckler, Clark, N.J.

[73] Assignee: RCA Corporation, New York, N.Y.

[22] Filed: Oct. 18, 1973

[21] Appl. No.: 407,762

[52] U.S. Cl. ..... 307/235 R, 178/69.5 TV, 307/232, 328/133

[51] Int. Cl. .......... H03k 5/20

[58] Field of Search .......... 307/232, 233, 235 R; 328/133, 134, 139; 178/69.5 TV

[56] References Cited

UNITED STATES PATENTS

| | | | |
|---|---|---|---|
| 2,876,382 | 3/1959 | Sziklai | 307/232 X |
| 3,646,362 | 2/1972 | Limberg | 307/232 X |
| 3,725,673 | 4/1973 | Frederiksen et al. | 307/235 R |
| 3,742,249 | 6/1973 | Gerlach et al. | 307/235 R |

*Primary Examiner*—John Zazworsky
*Attorney, Agent, or Firm*—Eugene M. Whitacre; Paul J. Rasmussen

[57] ABSTRACT

A signal combining circuit supplied current to both amplifiers of a first differential amplifier and to an error voltage storage circuit. The first differential amplifier is controlled by the difference between a first input waveform and its average value or a reference value and this difference results in charging and discharging of the error voltage storage circuit to raise and lower its voltage respectively. A second differential amplifier alternately keys the first differential amplifier into conduction in response to a second input waveform to update the error voltage and subtracts the output current from the signal combining circuit to shut off the first differential amplifier and hold the error voltage in a high impedance circuit until the next updating period.

10 Claims, 2 Drawing Figures

CURRENT OUTPUT FREQUENCY AND PHASE COMPARATOR

BACKGROUND OF THE INVENTION

This invention relates to automatic frequency and phase comparator circuits.

Automatic frequency and phase comparator circuits are used in several sub-systems in television receivers. Such schemes compare a synchronizing signal separated from the received signal with an internally generated signal which is required to be of the same frequency and in a predetermined time phase with the received sync signal. An error voltage is generated when the two compared signals are not of the same frequency or time phase. The error voltage is applied to a voltage controlled oscillator to bring the oscillator output signal into proper frequency and time phase with the received sync signal with which it is being compared.

Systems which operate in this manner include several types of automatic phase control circuits for use in television receiver horizontal deflection systems. Such systems, by virtue of their finite direct current loop gain, incorporate non-zero static phase error. That is, the direct current loop gain of the control circuit involved in the generation of the phase error voltage is not high enough to guarantee that the difference in phase between the two signals being compared caused by a drift in the oscillator frequency will result in self-correction of the phase error substantially to zero. Therefore, such a system does not provide the precision control necessary to insure that the receiver's internally generated oscillator signals are locked to the exact phase of the incoming oscillator synchronizing signals from the television transmitter. The differential phase error between the receiver's internal oscillator and the synchronizing signal is a function of the oscillator's free running frequency. This differential phase error is often referred to as the non-zero automatic frequency and phase comparator (AFPC) system static phase error.

A problem which arises by virtue of this non-zero static phase error relates to the immunity of the voltage controlled oscillator from loss of frequency and phase lock synchronization due to noise occurring during the error voltage sampling period. If the system exhibits non-zero static phase error, the filtered voltage from the phase comparator output terminal will not be the desired average value of the internally generated signal. This will occur because the internal oscillator's signals, being slightly out of phase with the received sync signals, will not be sampled symmetrically on both sides of their average value. Thus the phase comparator output voltage will be skewed closer to one of its voltage extremes than to the other. Noise energy has an equal probability of driving the synchronizing signal to a more positive or more negative phase relationship with respect to the internal oscillator, but the internal oscillator signal is already skewed in phase by the non-zero static phase error. Since the phase lock loop will lose synchronization when the phase comparator output voltage exceeds either the positive or negative voltage extreme of its characteristic curve, the occurrence of noise in the sync pulse has a higher probability of driving the loop out of lock because of the reduced phase margin on one side of its characteristic curve. A considerable amount of time is used by the receiver to regain sync each time it searches for the proper frequency and phase of oscillation which it had acquired before the non-zero static phase error and the occurrence of noise drove its oscillator out of sync.

From this discussion it can be seen that it would be desirable to provide a phase comparator which contributes a substantially zero static phase error to the horizontal phase lock system. Such a comparator would provide precise control of an internal oscillator in a television receiver by insuring that the frequency and phase of the internal oscillator are constantly being corrected to the frequency and phase of the received oscillator sync signals.

Additionally, a substantially zero static phase error horizontal phase lock loop would maintain the horizontal deflection system in a stable position with respect to the received sync thereby guaranteeing that the color, automatic gain control and automatic frequency control circuitry would remain substantially unaffected by drift in the free running horizontal oscillator frequency.

SUMMARY OF THE INVENTION

In accordance with the invention a comparator comprises a direct current voltage source, means for providing a first reference potential and first and second source of signals. A signal combining circuit is coupled to the direct current voltage source. A differential amplifier is coupled to the signal combining circuit and obtains operating current therefrom for generating output signals at an output terminal of the comparator formed at a junction of the signal combining circuit and the differential amplifier. The output signals are representative of the comparison of signals from the first source of signals coupled to a first input terminal of the differential amplifier and the first reference potential coupled to a second input terminal of the differential amplifier. Switching means are coupled to the second source of signals and to a terminal of the signal combining circuit and are responsive to the second source of signals for providing a current path for diverting the operating current from the terminal of the signal combining circuit thereby rapidly inhibiting the supply of current from the direct current voltage source to the differential amplifier in such a manner as to rapidly turn off the first differential amplifier.

The invention will best be understood by reference to the following description and accompanying drawings of which:

FIG. 1 is a block and schematic diagram of a television receiver incorporating a preferred embodiment of the invention; and FIG. 2 is a schematic diagram of the embodiment illustrated in FIG. 1.

DESCRIPTION OF THE PREFERRED EMBODIMENT

Figure 1:
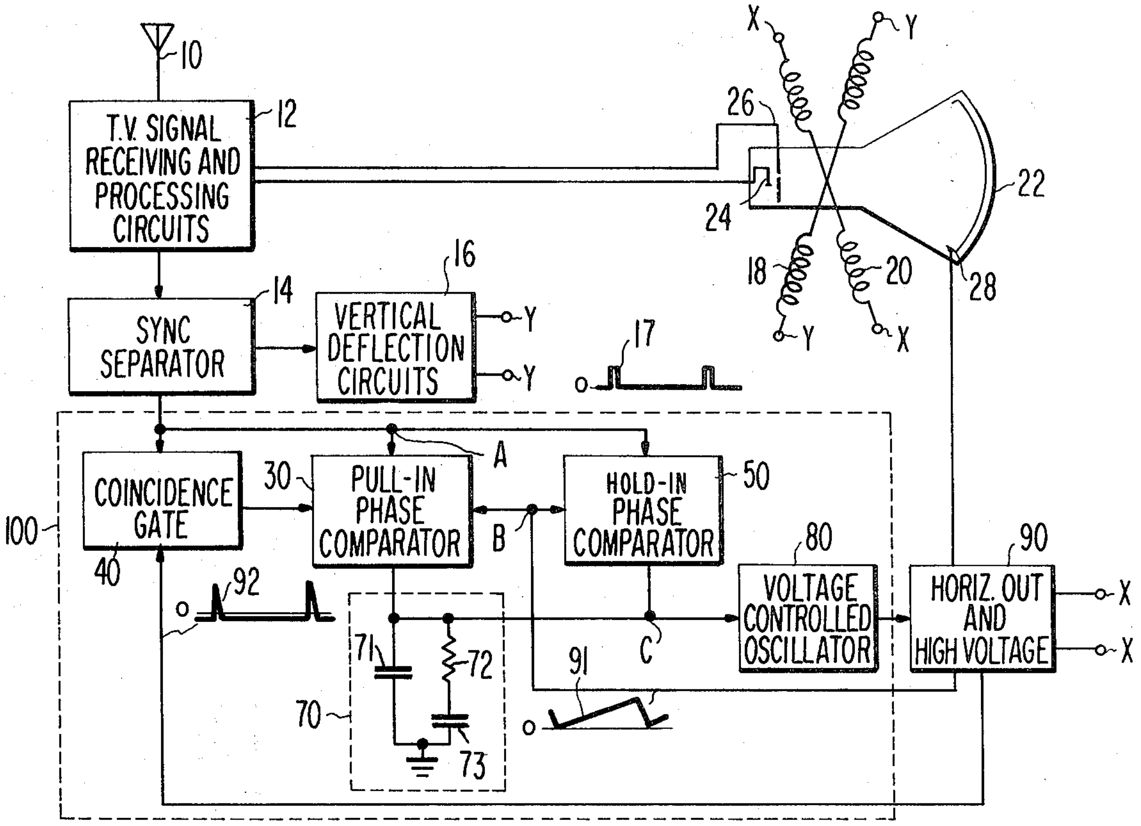

In the embodiment of the invention illustrated in FIG. 1, composite television signals are received by an antenna 10 and processed by television receiver signal processing circuits represented by a block 12 including a tuner and R.F. amplifier, an I.F. amplifier, video and audio detectors, an audio amplifier and speaker, a video amplifier, and in color receivers, chrominance and chrominance control circuitry. Video signals are coupled to one or more cathodes represented by a cathode 24 and one or more control grids represented by a grid 26 of a kinescope 22.

A sync separator 14 separates the vertical and horizontal synchronizing information necessary to produce a proper display from the composite video signals received and amplified in block 12. Vertical sync pulses are supplied from sync separator 14 to conventional vertical deflection circuits represented by block 16 which use the vertical sync pulses to synchronize the generation of vertical deflection sawtooth current waveforms at terminals Y—Y which are coupled to vertical deflection coils 18 of kinescope 22.

Sync separator 14 also supplies horizontal sync pulses 17 which are coupled to a dual mode automatic frequency and phase control (AFPC) system 100. Sync separator 14 is coupled to input terminals of a pull-in phase comparator 30, a coincidence gate 40, and a hold-in phase comparator 50. Another input terminal of coincidence gate 40 receives flyback pulses 92 from a horizontal deflection and high voltage stage 90. The output terminal of coincidence gate 40 is coupled to another input terminal of pull-in phase comparator 30. Sawtooth horizontal deflection waveforms 91 are also fed back to system 100 from horizontal deflection and high voltage circuit 90. These sawtooth waveforms are fed to other input terminals of both pull-in phase comparator 30 and hold-in phase comparator 50. Output terminals of both pull-in phase comparator 30 and hold-in phase comparator 50 are coupled to a compensation network 70 comprising an error voltage storage capacitor 71 in parallel with a series "anti-hunt" circuit comprising resistor 72 and capacitor 73 coupled to ground.

The ungrounded terminal of compensation network 70 is also coupled to a high input impedance voltage controlled oscillator 80, the output terminal of which is coupled to horizontal deflection and high voltage circuit 90.

Pull-in phase comparator 30 and hold-in phase comparator 50 control the frequency and phase respectively of horizontal voltage controlled oscillator 80 by charging compensation network 70 to a direct current error voltage. Voltage controlled oscillator 80 responds to this error voltage by shifting its oscillation frequency to coincide with the frequency of the horizontal synchronizing signals coupled from sync separator 14.

The control of the oscillation frequency and phase of voltage controlled oscillator 80 insures proper deflection current waveforms are generated and amplified in horizontal output and high voltage circuit 70 which drives a pair of horizontal deflection windings 20 to which it is coupled at terminals X–X. High voltage generated in horizontal deflection and high voltage circuit 90 is supplied to a final anode 28 of kinescope 22.

Dual mode AFPC circuit 100 consists of two loops. One loop pulls in the oscillation frequency of the horizontal voltage controlled oscillator 80, i.e., driving voltage controlled oscillator 80 to within a small error of the received horizontal deflection frequency. The other loop holds the voltage controlled oscillator 80 at the horizontal deflection frequency and phase. Switching from one loop to the other is done by coincidence gate 40 which compares the horizontal sync pulses from sync separator 14 with flyback pulses 92 generated during the horizontal retrace interval in horizontal deflection and high voltage circuit 90.

When the phase error between the horizontal sync pulse 17 and flyback pulse 92 is considerable, pull-in comparator 30 is in the control loop of voltage controlled oscillator 80. Pull-in phase comparator 30 may be of any suitable type which exhibits wide frequency bandwidth and relatively low output impedance. Pull-in phase comparator 30 is used to pull voltage controlled oscillator 80 into approximately the oscillation frequency of horizontal sync pulses 17. When this is accomplished, the phase error between horizontal sync pulses 17 and flyback pulses 92 is sufficiently small to allow approximate phase coincidence detection by gate 40. At that time pull-in phase comparator 30 is disconnected from the AFPC loop by coincidence gate 40, and hold-in phase comparator 50, which is characterized by narrow frequency bandwidth and high output impedance, acquires control of the phase lock loop.

It should be noted that in this embodiment switching is done without switching hold-in phase comparator 50. This is possible because while pull-in phase comparator 30 is a voltage output phase comparator with its characteristic finite direct current loop gain, hold-in phase comparator 50 is a current output phase comparator and therefore exhibits infinite direct current loop gain and zero static phase error. Thus the effect of hold-in phase comparator 50 is negligible when its output impedance is loaded by the presence of pull-in phase comparator 30. It should be further noted that while hold-in comparator 50 is referred to as a phase comparator, it necessarily also functions as a frequency comparator since the concepts of frequency and phase are inseparable when they refer, as in this situation, to periodic sampling of a periodic waveform.

Figure 2:
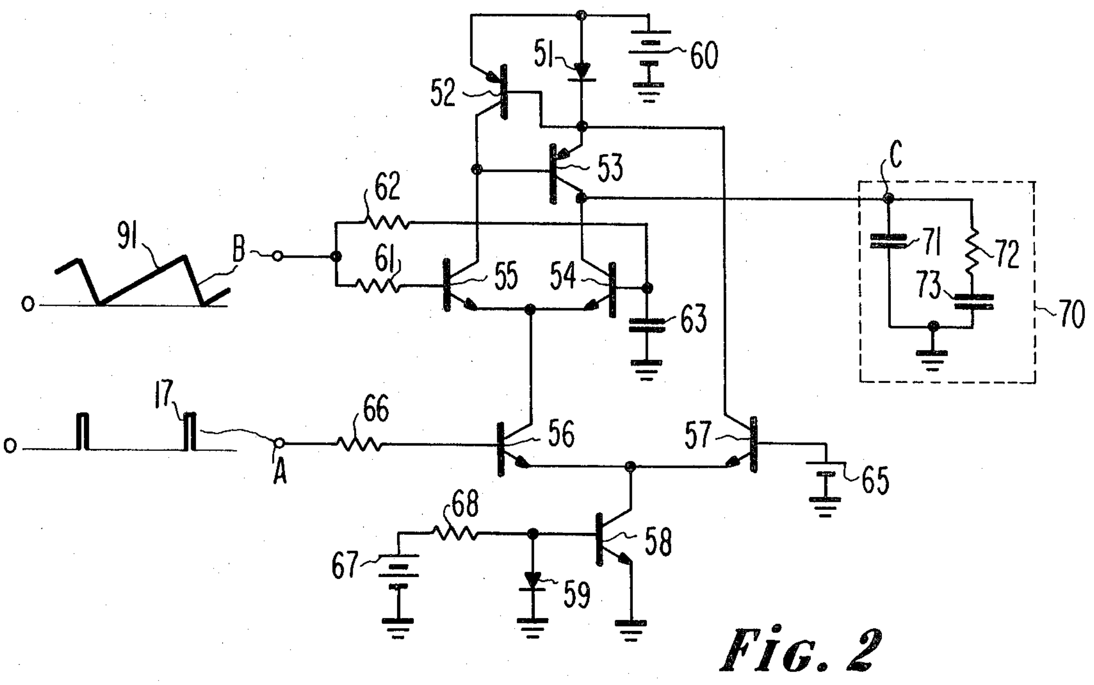

FIG. 2 illustrates a preferred embodiment of current output hold-in phase comparator 50. Terminal A is the horizontal sync input terminal shown in FIG. 1 to which sync pulses 17 are coupled. Terminal B is the horizontal sawtooth voltage input terminal to which sawtooth waveforms 91 are coupled and terminal C is the output terminal coupled to compensation network 70 as explained in the discussion of FIG. 1.

A source of direct current voltage 60 is coupled to the anode of a diode 51 and to the emitter of a transistor 52. The base of transistor 52 is coupled to the cathode of diode 51. The collector of transistor 52 is connected to the base of a transistor 53. The emitter of transistor 53 is also connected to the cathode of diode 51. This configuration of diode 51 and transistors 52 and 53 comprises a signal combining circuit.

The collectors of transistors 52 and 53 are coupled to the collectors of a transistor 55 and a transistor 54 respectively. The emitters of transistors 54 and 55 are joined forming a first differential amplifier configuration. The bases of transistors 54 and 55 are coupled through two resistors 62 and 61 respectively to terminal B, the source of horizontal sawtooth voltage. The base of transistor 54 is also coupled through a capacitor 63 to ground. The junction of the collectors of transistors 53 and 54 forms an output terminal, terminal C, of current output phase comparator 50.

The joined emitters of differential amplifier transistors 54 and 55 are coupled to the collector electrode of a transistor 56. The base of transistor 56 is coupled through a current limiting resistor 66 to terminal A. The emitter of transistor 56 is coupled to the emitter of a transistor 57 and to the collector of a transistor 58.

The collector of transistor 57 is coupled to the junction of the cathode of diode 51, the base of transistor 52 and the emitter of transistor 53. The base of transistor 57 is coupled to a second source of direct current voltage 65. The configuration comprising transistors 56 and 57 is a second differential amplifier.

The emitter of transistor 58 is coupled to ground and its base is coupled through a resistor 68 to a source of direct current voltage 67. The base of transistor 58 is also coupled to the anode of a temperature compensating diode 59, the cathode of which is coupled to ground.

The collector of transistor 53 is an output terminal of the signal combining circuit comprising elements 51, 52, and 53. The junction of the collector of transistor 52 and the base of transistor 53 is one input terminal, and the joined cathode of diode 51, the base of transistor 52 and the emitter of transistor 53 is a second input terminal of the signal combining circuit. The base-emitter junction drop of transistor 52 is matched by the forward diode drop of diode 51 since in this embodiment the two are constructed of the same material, are doped in substantially the same manner, and the base-emitter junction area of transistor 52 is substantially equal to the anode cathode junction area of diode 51.

Further, the collector voltage of transistor 52 is biased below its base voltage by the base-emitter junction voltage drop of transistor 53. Transistor 53 regulates the voltage across diode 51 at the base-emitter junction voltage drop of transistor 52 so that the current through diode 51 equals the current into the emitter of transistor 52. Neglecting base currents, which are small, the emitter current of transistor 53 equals the current through diode 51 or transistor 52 less the collector current of transistor 57. The phase comparator output current at the junction of the collectors of transistors 53 and 54 will be the current through diode 51 less the collector currents of transistors 54 and 57.

Since the current through diode 51 is approximately equal to the collector current of transistor 55 when transistor 55 is conductive, the phase comparator output current approximately equals the collector current of transistor 55 less the collector currents of transistors 54 and 57.

When transistor 57 is conductive and its collector current is greater than the emitter current of transistor 52, transistor 53 is quickly driven into cutoff. Transistors 54, 55, and 56 are also rendered non-conductive by virtue of substantially zero collector currents in transistors 52 and 53 and the high emitter voltage of transistor 57.

The signal combining circuit comprising elements 51, 52, and 53 supplies equal currents to both collectors of the differential amplifier consisting of transistors 54 and 55 when transistor 57 is non-conductive.

The average amplitude of the horizontal sawtooth voltage waveform 91 fed back from horizontal output and high voltage circuit 90 through terminal B is obtained by "smoothing" sawtooth voltage waveform 91 in capacitor 63 of an integrator comprising capacitor 63 and resistor 62. When the amplitude of horizontal sawtooth voltage waveform 91 is positive with respect to its average value, transistor 55 will be more conductive than transistor 54 and an error current will flow through terminal C driving the error voltage stored in compensation circuit 70 higher to effect a frequency shift in a first direction in the voltage controlled oscillator 80 (shown in FIG. 1 coupled to terminal C).

Similarly, when the input sawtooth voltage feedback 91 at terminal B is lower than the "smoothed" or average value of the sawtooth voltage as stored on capacitor 63, a current will flow through terminal C which will decrease the error voltage stored in compensation network 70 to achieve an opposite frequency shift in the voltage controlled oscillator 80.

The high impedance seen when looking back through current output terminal C can be attributed to the joined high impedance collector terminals of transistors 53 and 54 which comprise the current generator for current output hold-in phase comparator 50.

It is desired to sample the feedback sawtooth voltage signal from horizontal output and high voltage circuit 90 only during a brief interval when the sawtooth voltage is changing at the greatest rate, i.e., during the horizontal retrace interval. Therefore, a second differential amplifier comprising transistors 56 and 57 is used to key the first differential amplifier only during the horizontal retrace interval.

This is accomplished by driving transistor 56 of the second differential amplifier in such a manner as to allow transistors 54 and 55 to be conductive only during a portion of the horizontal retrace interval. To achieve this result, horizontal sync pulses at terminal A drive differential amplifier transistor 56 through base protection resistor 66. When horizontal sync voltage is not present at terminal A, the differential amplifier comprising transistors 54 and 55 is not supplying an output error current to terminal C since both are rendered non-conductive by virtue of the non-conductive state of transistor 56.

During the interval when the horizontal sync voltage is not present at terminal A, transistor 57 of the second differential pair is conducting by virtue of the direct current supply voltage 65 in its base circuit. The collector of transistor 57 serves to subtract from the output current of the signal combining circuit comprising elements 51, 52, and 53 during this interval since no current can flow through the collector of either transistor 52 or transistor 53 when the first differential amplifier comprising transistors 54 and 55 is non-conductive. This subtraction of the output current of the signal combining circuit serves to drive transistor 53 quickly into cutoff.

Thus it may be seen that the second differential amplifier comprising transistors 56 and 57 and their associated components acts as a switch. This second differential amplifier switches the first differential amplifier comprising transistors 54 or 55 "on" when keying pulse 17 occurs at the base of transistor 56. When positive keying pulse 17 is not present at terminal A, the emitter of transistor 53 of the signal combining circuit comprising elements 51, 52 and 53 is clamped at the low collector potential of transistor 57, rapidly turning off transistors 52, 53, 54 and 55.

Transistor 58 and its associated components, direct current voltage source 67, base protection resistor 68 and temperature stabilizing diode 59 comprise a constant current sink for the output current of the second differential amplifier whether that current is the output current of the first differential amplifier, i.e., transistors 54 and 55 supplied through transistor 56, or the subtracted input current of the signal combining circuit comprising elements 51, 52, and 53 which shuts off transistor 53 when transistor 56 is non-conductive.

It can be seen from the foregoing discussion that current output phase comparator 50 will continue to supply error current at its high impedence output terminal C from the joined collectors of transistors 53 and 54 to the substantially infinite direct current impedance of compensation network 70 as long as there is a phase error between the horizontal sync signal 17 at terminal A and the horizontal sawtooth feedback voltage signal 91 at terminal A. Hence it can be seen that the control loop in which hold-in phase comparator 50 actively participates, once pull-in phase comparator 30 is switched out of circuit, is a "perfect integral" or zero static phase error control loop. The important advantage of such a control circuit is that it insures that horizontal voltage controlled oscillator 80 and horizontal output circuit 90 will be in perfect phase sync with the incoming horizontal sync pulses 17 at terminal A and there will be zero error voltage across compensation network 70 when the AFPC loop reaches equilibrium.

What is claimed is:

1. A comparator comprising in combination:

a direct current voltage source;

a first source of signals;

means coupled to said first source of signals for providing a first reference potential representative of signals from said first source;

a signal combining circuit coupled to said direct current voltage source;

a first differential amplifier coupled to said signal combining circuit for obtaining operating current from said direct current voltage source through said signal combining circuit and for creating at a junction of said signal combining circuit and said first differential amplifier an output terminal of said comparator, said first differential amplifier also having a first input terminal coupled to said first source of signals and having a second input terminal coupled to said means providing a first reference potential for comparing signals from said first source to said first reference potential;

a second source of signals;

switching means coupled to said second source of signals and to a terminal of said signal combining circuit and responsive to said second source of signals for providing a current path for diverting said operating current from said terminal of said signal combining circuit thereby rapidly inhibiting the supply of current from said direct current voltage source to said first differential amplifier in such a manner as to rapidly turn off said first differential amplifier.

2. A comparator according to claim 1 wherein:

said switching means comprises means providing a second reference potential; and a second differential amplifier coupled to said first differential amplifier, to said second source of signals, to said second reference potential and to said current path for diverting operating current from said terminal of said signal combining circuit for keying on said first differential amplifier at a predetermined threshold value of said second signals determined by said second reference potential and for rapidly keying off said first differential amplifier when said threshold value is absent from said second differential amplifier.

3. A comparator according to claim 2 wherein:

said first differential amplifier comprises first and second active current conducting devices with first and second control electrodes coupled to an integrating circuit for providing as said first reference potential at said second input terminal a potential which corresponds to the average value of said signals from said first source of signals.

4. A comparator according to claim 3 wherein:

said second differential amplifier comprises third and fourth active current conducting devices, a terminal of the main current conducting path of said third active current conducting device being coupled to an output terminal of said first differential amplifier and a control electrode of which is keying input terminal of said second differential amplifier for providing an output current path for said first differential amplifier when said threshold value is present on said keying input terminal; and said fourth active current conducting device has its main current conducting path coupled at one terminal to said signal combining circuit to form said current path for diverting operating current from said terminal of said signal combining circuit and at another terminal to a terminal of the main current conducting path of said third active current conducting device.

5. A comparator according to claim 4 wherein:

the junction of said third and fourth active current conducting devices is coupled to a terminal of constant current regulating means, another terminal of which is coupled to a third source of reference potential for providing a path for constant current from said source of direct current voltage to said third source of reference potential in the presence or absence of said threshold value on said keying input terminal.

6. A comparator comprising:

a source of direct current voltage;

a signal combining circuit coupled to said source of direct current voltage;

a first differential amplifier comprising first and second active current conducting devices, said first and second active current conducting devices each having one terminal of their main current conducting paths coupled to said signal combining circuit for receiving operating currents therefrom, the junction of said second device and a terminal of said signal combining circuit comprising an output terminal of said comparator, and the other terminals of the main current conducting paths of said first and second active current conducting devices being coupled to one another;

a first source of signals and a first source of reference potential to be compared with one another coupled to input terminals of said first and second active current conducting devices respectively;

a source of keying signals;

switching means having terminals coupled to said source of keying signals and to a terminal of said signal combining circuit and responsive to said source of keying signals for providing a current path from said terminal of said signal combining circuit for diverting said operating currents from said main current conducting paths of said first and second active current conducting devices thereby rapidly turning off said first and second active current conducting devices in response to said keying signals coupled to a terminal of said switching means.

7. A comparator according to claim 6 wherein:

said switching means comprises a second differential amplifier comprising third and fourth active current conducting devices, an input terminal of said third active current conducting device being coupled to said source of keying signals, a terminal of the main current conducting path of said third device being coupled to the common terminal of said first and second active current conducting devices and a terminal of the main current conducting path of said fourth device being coupled to said terminal of said signal combining circuit in such a manner as to divert said operating currents supplied by said signal combining circuit from said main current conducting paths of said first and second active current conducting devices through said main current conducting path of said fourth device for disabling said first differential amplifier by rapidly removing the operating currents therefrom.

8. A comparator according to claim 7 wherein:

the remaining terminals of the main current conducting paths of said third and fourth devices are coupled to one another and to constant current regulating means.

9. A comparator according to claim 8 wherein:

said input terminal of said second device is coupled through an integrating circuit to said input terminal of said first device to provide as said first source of reference potential coupled to an input terminal of said second device the average value of said first signals coupled to said input terminal of said first device; and said keying signal applied to said input terminal of said third device renders said third device conductive thereby preventing diversion of said operating currents from said first and second active current conducting means and providing an output current at said output terminal of said comparator representative of a comparison of said first signals applied to said input terminal of said first active current conducting device with the average value of said first signals applied to said input terminal of said second active current conducting device.

10. A comparator according to claim 9 wherein:

said first, second, third, and fourth active current conducting devices are transistors;

said signal combining circuit includes fifth and sixth transistors and a diode, the anode of said diode and the emitter electrode of said fifth transistor being coupled to said direct current voltage supply and the base electrode of said fifth transistor being coupled to the cathode of said diode and to the emitter electrode of said sixth transistor forming a terminal of said signal combining circuit to which a terminal of the main current conducting path of said fourth transistor is coupled to provide a terminal through which operating currents can be diverted from said first and second transistors when said fourth transistor is conductive; and the base electrode of said sixth transistor is coupled to the collector electrode of said fifth transistor and to a terminal of the main current conducting path of said first transistor for providing operating current thereto when said fourth transistor is non-conductive and the collector electrode of said sixth transistor is coupled to the collector electrode of said second transistor for providing operating current thereto and output current from said comparator when said fourth transistor is non-conductive, said junction of said collectors of said second and sixth transistors forming said output terminal of said comparator.

* * * * *